(12) United States Patent
Ciet et al.

(10) Patent No.: US 8,185,749 B2
(45) Date of Patent: *May 22, 2012

(54) SYSTEM AND METHOD FOR REVISING BOOLEAN AND ARITHMETIC OPERATIONS

(75) Inventors: Mathieu Ciet, Paris (FR); Augustin J. Farrugia, Cupertino, CA (US); Filip Toma Paun, Menlo Park, CA (US); Jean-Francois Riendeau, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 12/203,036

(22) Filed: Sep. 2, 2008

(65) Prior Publication Data

US 2010/0058477 A1    Mar. 4, 2010

(51) Int. Cl.
| | |
|---|---|
| *H04L 9/32* | (2006.01) |
| *H04L 29/06* | (2006.01) |
| *G06F 11/30* | (2006.01) |
| *G06F 11/00* | (2006.01) |
| *G06F 7/04* | (2006.01) |
| *G06F 9/00* | (2006.01) |

(52) U.S. Cl. ........ 713/190; 713/154; 713/168; 713/189; 713/193; 726/13; 726/22; 726/26

(58) Field of Classification Search ........... 713/190, 713/154, 168, 189, 193; 726/13, 22, 26
See application file for complete search history.

(56) References Cited

U.S. PATENT DOCUMENTS

| | | | | |
|---|---|---|---|---|
| 5,892,899 | A   * | 4/1999 | Aucsmith et al. | 726/27 |
| 7,620,987 | B2 * | 11/2009 | Shelest et al. | 726/22 |
| 7,640,583 | B1 * | 12/2009 | Marinescu et al. | 726/22 |
| 7,757,097 | B2 * | 7/2010 | Atallah et al. | 713/187 |
| 2004/0003264 | A1 * | 1/2004 | Zeman et al. | 713/190 |
| 2007/0039048 | A1 * | 2/2007 | Shelest et al. | 726/22 |
| 2009/0319804 | A1 * | 12/2009 | Qi et al. | 713/190 |
| 2010/0251378 | A1 * | 9/2010 | Eker et al. | 726/26 |

* cited by examiner

*Primary Examiner* — Mohammad Reza
(74) *Attorney, Agent, or Firm* — Novak Druce + Quigg LLP

(57) ABSTRACT

Disclosed herein are systems, methods, computer readable media and special purpose processors for obfuscating code. The method includes extracting an operation within program code, selecting a formula to perform the equivalent computation as the extracted operation, and replacing the extracted operation with the selected formula. The formula can be selected randomly or deterministically. The extracted operation can be an arithmetic operation or a Boolean operation.

15 Claims, 3 Drawing Sheets

FIG. 3

| CARRY REDUCTION USING ALTERNATE FUNCTION ||
|---|---|
| a = 01110011 (115 in decimal format)<br>b = 01011010 (90 in decimal format)<br><br>a = 01110011<br>b = 01011010   — 302 | |
| a + b   — 304<br><br>111  1  ← 4 CARRIES<br>01110011<br>+ 01011010<br>————————<br>11001101 | **a xor b + 2 * (a & b)**<br><br>1  ← 1 CARRIES   — 312<br>00101001<br>+ 10100100<br>————————<br>11001101 |
| a & b   — 306<br><br>       ← 0 CARRIES<br>01110011<br>& 01011010<br>————————<br>01010010 | a \| b<br><br>       ← 0 CARRIES   — 314<br>01110011<br>\| 01011010<br>————————<br>01111011 |
| a ^ b   — 308<br><br>       ← 0 CARRIES<br>01110011<br>⊕ 01011010<br>————————<br>00101001 | a \| b   — 316<br>111  1<br>01111011      (a \| b)<br>+ 01010010   (a & b)<br>————————<br>11001101 |
| **(a & b) * 2 =   — 310<br>(a & b) << 1**<br><br>a & b = 01010010<br>(a & b) << 1 = 10100100 | 1   ← 1 CARRIES   — 318<br>250<br>369<br>———<br>619 |

| | ALTERNATE FUNCTIONS |
|---|---|
| 402 | $a+b = a \oplus b + 2*(a \,\&\, b)$ |
| 404 | $a+b = (a \mid b) + (a \,\&\, b)$ |
| 406 | $a \oplus b = a+b - 2*(a \,\&\, b)$ |
| 408 | $a \oplus b = a - ((a \,\&\, b) << 1) + b$ |
| 410 | $a \oplus b = a - (a \,\&\, b) + b - (a \,\&\, b)$ |
| 412 | $a - b = a \wedge C(b) + 2*(a \,\&\, C(b)) + 1$ |
| 414 | $a \mid b = a+b - 2*[(a+b-2*(a \,\&\, b)) \,\&\, (a \,\&\, b)]$ |

SYSTEM AND METHOD FOR REVISING BOOLEAN AND ARITHMETIC OPERATIONS

CROSS-REFERENCE TO RELATED APPLICATIONS

This application relates to Application 8802.024.NPUS00 P6914, titled "System and Method for Conditional Expansion Obfuscation", Application 8802.017.NPUS00 P6835, titled "System and Method for Branch Extraction Obfuscation", Application 8802.011.NPUS00 P6792, titled "System and Method for Array Obfuscation", and Application 8802.030.NPUS00 P7001, titled "System and Method for Modulus Obfuscation". The contents of each of these applications are herein incorporated by reference.

BACKGROUND OF THE INVENTION

1. Field of the Invention

The present invention relates to the field of computer security, more specifically to new ways of computing basic arithmetic and Boolean operations to obfuscate program code.

2. Introduction

Protection of digital content is important for many enterprises. Digital Rights Management (DRM) technologies attempt to control usage of digital content by preventing or limiting access to the digital content and by hindering attempts to copy or convert data to another format. Content providers often protect content through cryptography, but also use other methods.

Cryptography is one traditional method of protecting data. Cryptography protects communications between two mutually trusting parties from thievery or hackers by attack on the data in transit. Encryption is the process of obfuscating information in a systematic way such that only the intended recipient holding the secret key can read the data. Decryption is the process of removing the protection and retrieving the original data using a secret key. Sometimes, cryptography is not feasible or desirable.

Code obfuscation is the process of writing software code in such a way that it is difficult for others to follow and/or reverse engineer. Obfuscation is an attempt to slow down an attacker by preventing unauthorized access to program source code. Obfuscating code makes it time-consuming but not impossible to reverse engineer a program and does not provide a level of security similar to modem encryption schemes. Code obfuscation is applicable to DRM schemes where the adversary has access to program code containing secret information. Accordingly, what is needed in the art is an improved way to obfuscate code for the purpose of preventing unauthorized access.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, computer readable media and special purpose processors for obfuscating code. The method includes extracting an operation within program code, selecting a method to perform an equivalent computation as the extracted operation, and replacing the extracted operation with the selected method. The method can be selected randomly or deterministically. The extracted operation can be an arithmetic operation or a Boolean operation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3 illustrates the process of carry reduction using alternate functions;

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
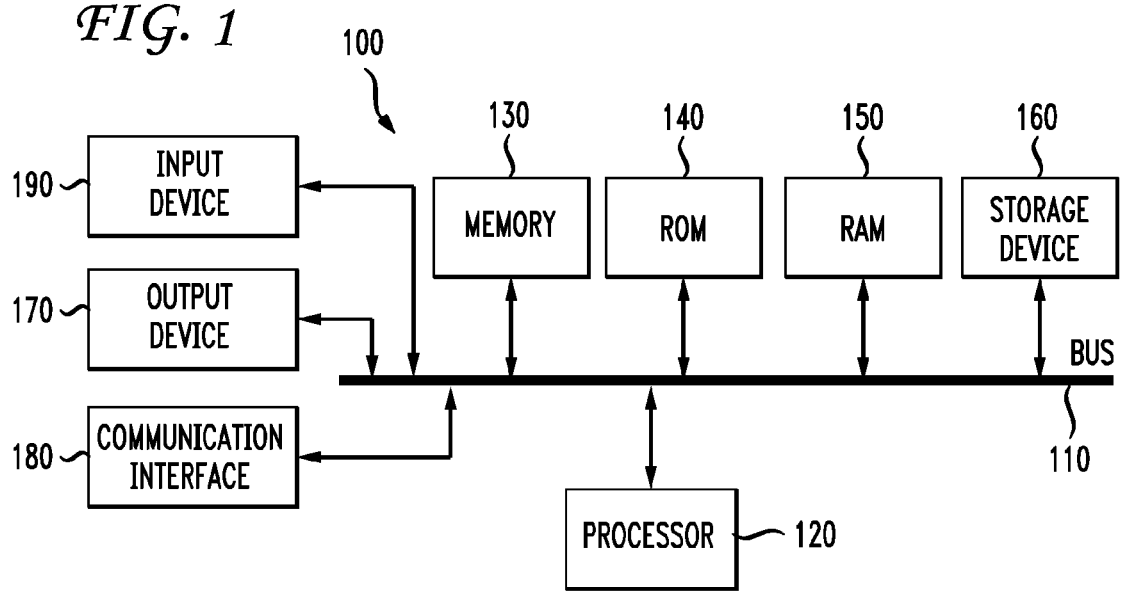
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Of course, a processing unit includes any general purpose CPU and its controlling software as well as a special-purpose processor where software is effectively incorporated into the processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
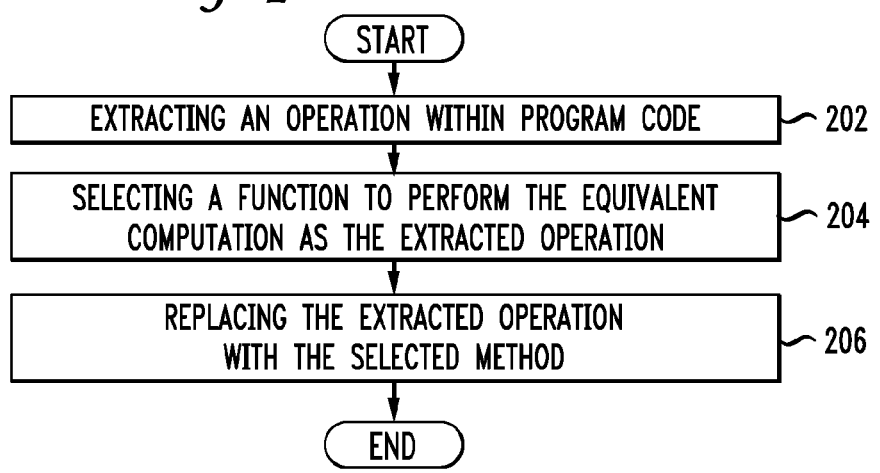
FIG. 2 illustrates the process of replacing basic operations.

Keeping these basic principles and systems in mind, the disclosure turns to the example method for performing basic arithmetic and Boolean operations illustrated in FIG. 2. The method is discussed in terms of a system configured to perform the method. The system extracts a basic operation from program code (202). The extracted operation can be an arithmetic operation or a Boolean operation, for example. Extracted operations can be nearly any other type of operation, such as a string copy or a bit shift.

Basic arithmetic operations include addition and subtraction and basic Boolean operations include XOR ($\oplus$), OR (|) and AND ( & ). A XOR operation evaluates to true if one and only one of the two input values is true. For example, 1$\oplus$0 and 0$\oplus$1 are true, but 1$\oplus$1 and 0$\oplus$0 are false. An OR operation evaluates to true if either inputs is true. For example, 1|1, 1|0, and 0|1 are all true. 0|0 is false. An AND operation evaluates to true only both inputs are true. For example, 1 & 1 is true. 1 & 0, 0 & 1, and 0 & 0 are all false.

The system then selects a formula to perform an equivalent operation (204) as the extracted operation. The system can select the formula randomly, deterministically, or otherwise. Some sample equivalent functions for the Boolean operator "exclusive or" (or XOR), addition, subtraction, and OR are detailed below:

$$(\text{for XOR}): a \oplus b = a+b-2*(a\&b) \quad \text{Equation 1}$$

$$(\text{for XOR}): a \oplus b = a-((a\&b)<<1)+b \quad \text{Equation 2}$$

$$(\text{for XOR}): a \oplus b = a-(a\&b)+b-(a\&b) \quad \text{Equation 3}$$

$$(\text{for subtraction}): a-b = a \oplus C(b)+2*(a\&C(b))+1 \quad \text{Equation 4}$$

$$(\text{for addition}): a+b = a \oplus b+2*(a\&b) \quad \text{Equation 5}$$

$$(\text{for addition}): a+b = (a|b)+(a\&b) \quad \text{Equation 6}$$

$$(\text{for OR}) \; a|b = a+b-2((a+b-2*(a\&b))\&(a\&b)) \quad \text{Equation 7}$$

This list of equivalent functions is not exhaustive. The system may employ other equivalent equations. As associativity and community properties of various functions are considered, the system can increase the number of formulas available that perform equivalent operations.

Figures 4, 5:
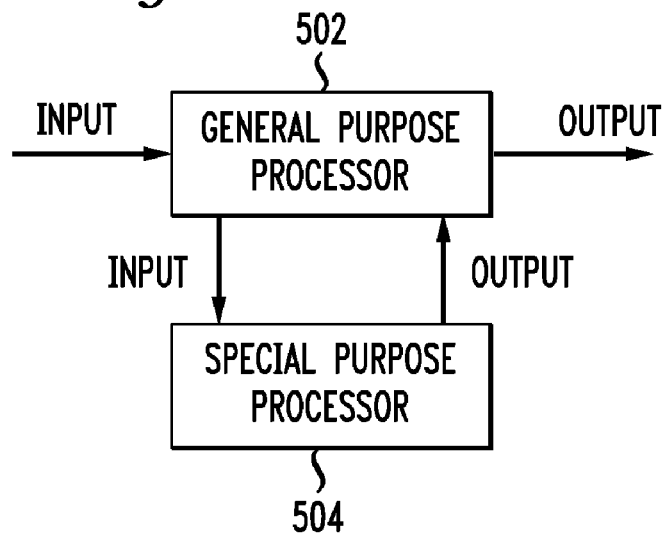
FIG. 4 illustrates a table of formulas to replace basic operations.
FIG. 5 illustrates the relationship between general and special purpose processors.

Equations 1-7 are also outlined in FIG. 4. To demonstrate that both sides of these equations are equivalent to each other, assume that a is 47 and b is 82. In binary, a is 00101111 and b is 01010010. In equation 1, 47$\oplus$82 (or 00101111$\oplus$01010010)=125 (or 1111101). Starting from the right, each bit is XORed. Stepping through the calculations for the other part of equation 1 highlights how the right side of equation 1 is equivalent to the left side of equation 1, but performs less carries to obtain the same result. First, 47+82=129. This step requires carries when calculated in binary. 47 & 82 (or 00101111 & 01010010) equals 2. This step does not require carries because it is not an ADD. 2*2=4. This step could require carries because multiplication can be implemented as a series of ADDs, but in this case, a bit shift is used, which does not require any carries. So, 129−4=125, the same result as the XOR operation. Each of equations 1-7 is equivalent for any values of a and b, if similarly worked out.

The system then replaces the extracted operation with the selected formula (206). The system optionally builds a special purpose processor using the selected formula in place of the extracted operation. The system can generate the special purpose processor is by a process of extracting an operation within program code, selecting a formula that performs the equivalent operation, and replacing the extracted operation with the formula.

The XOR of two larger numbers is performed by converting the number to a bit representation and performing a bitwise XOR on each bit. FIG. 3 illustrates how to XOR the decimal numbers 115 and 90. First, the system converts the numbers to bit representations (or bitstreams): 01110011 and 01011010 (302). Then the system performs a bitwise XOR starting at the rightmost position, treating each pair of corresponding bits individually, according to the XOR logic laid out above. The system places the result in the rightmost position of the new bitstream, and the system repeats this process on all bits 308. The Boolean operations OR 314 and AND 306 are performed in a similar manner to XOR. The result of ORing two bits is 1 when at least one of the bits used in the computation is 1, and is 0 only when both bits are 0 (314). The result of ANDing two bits is 1 when both bits are 1 otherwise it is 0 (306).

To highlight the equivalence of Equation 5 above, a+b (304) results in a bitstream of 11001101. The other side of the equation, a $\oplus$b+2*(a & b) 312, also results in a bitstream of 11001101. Both sets of calculations yield the same result given the same inputs.

Computing binary addition in the classical way is more complex than the Boolean operations since binary addition requires the use of carries. Carries are used when addition is performed on two numbers in binary format just as they are used in decimal format. For instance, to add the numbers 250 and 369 a carry is required (318). Adding is performed from right to left, starting with the numbers in the rightmost position. The only addition that requires a carry is 5+6, which results in 11. The least significant digit is used in the total sum, and the most significant digit is carried to the next column, producing the answer 619. Subtraction can be viewed as the addition of negative numbers and will not be discussed in detail.

Adding binary numbers is a very simple task, and similar to the longhand addition of decimal numbers. As with decimal numbers, addition starts by adding the bits (digits) one column at a time, from right to left 318. Just as with decimal addition, when the sum in one column is a two-bit (two-digit) number, the least significant figure is written as part of the total sum and the most significant figure is carried to the next left column. For example, the system adds the decimal numbers 115 and 90. These bit representations of these numbers are 01110011 and 01011010, respectively (302). Starting with the rightmost bits, the system adds 1 and 0, resulting in 1 with no carries (304). Next, the system adds 1 and 1, resulting in the decimal value 2 with a bit representation of 10. Since the result is a two-bit number, the system keeps 0 for part of the sum and carries the 1 to the next column. Next, the system adds 0 and 0 and the carried value from the previous addition. The result is 1 with no carries. The system continues this process until all bits have been added and all carried values are used. Note that in this example the system performs four carries (304).

Several examples of substituting functions for basic arithmetic operations are disclosed. One example is a+b is equivalent to a $\oplus$b+2*(a & b). The first part of the formula, a $\oplus$b, performs the addition without carries 308 because it is not an add calculation; it is a XOR calculation. The second part of the formula, 2*(a & b), performs a bitwise left shift 310 on the result of a & b (306). In a left shift operation, each bit is shifted one position to the left, and a new bit having the value of 0 is inserted into the rightmost position. Multiplying by 2 is a decimal equivalent to a left shift. The second part of the formula contains some of the carries and the rest are obtained from the addition of the first and second parts of the formula 312. This equivalent formula only requires one carry during addition 312, while the classical formula requires four carries 304.

Another equivalent for addition is (a|b)+(a & b). The first part of the formula, a|b 314, and the second part, a & b 306, do not require any carries since no addition is performed. When the first and second parts are added 316, four carries are used. Although this second equivalent formula for addition does not reduce the number of carries, it does obfuscate program code by making code more difficult for a human to follow and/or understand.

An adversary can easily follow traditional arithmetic and Boolean operations in program code. For instance, a command to add 4 and 5 in assembly language can include steps to add and store the result. Using one of the alternate equivalent addition functions, a command to add 4 and 5 includes a sequence of multiple steps including a XOR, AND, a left shift operation and storing the intermediate and final results. The alternate function is more difficult to follow and accomplishes the goal of making reverse engineering a more time-consuming task.

Aside from hindering reverse engineering attempts, a system using this method can benefit from optimizations of using alternate functions. For instance, when running a carry-save-adder, several operations can be done in parallel. A carry-save-adder is a digital adder used in computer microarchitecture. It differs from other digital adders in that it outputs two numbers: a sequence of partial sum bits and a sequence of carry bits. A computer system can use adders to accumulate partial sums in multiplication, which involves the addition operation. Cryptography systems can use adders when multiplying large numbers, for instance in computing a signature using elliptic curves or RSA (an algorithm for public-key cryptography). A system that uses alternate functions for arithmetic or Boolean operations can obtain hardware performance benefits.

FIG. 4 illustrates a table of sample formulas to replace basic operations. This list is not exhaustive and should not be considered limiting of the scope of the disclosure. The formulas a+b−2*(a & b) 406, a−((a & b)<<1)+b 408, and a−(a & b)+b−(a & b) 410 are equivalent to a $\oplus$b. In computer memory, these formulas appear as three different processes even though they perform the same operation. Besides this already difficult task for an adversary, replacing XOR operations with these equivalent operations generates more code for an adversary to step through. Even more complex but equivalent processes can be built when XORing more than two values. For example, XORing four values will give rise to tens of different processes. No theoretical limit is foreseen on the number of values passed to a XOR function.

The formula a $\oplus$C(b)+2*(a & C(b))+1 is equivalent to a−b 412, where C(b) is the bit complement. The system computes the bit complement by flipping each bit in the bitstream. Each bit is changed to its opposite, a zero to a one and a one to a zero. For example, if b is 76 (or 01001100 in binary), the complement of 76, or C(b), is 179 (or 10110011). An alternate OR operation is a+b−2*[(a+b−2*(a & b)) & (a & b)] 314.

In another aspect of this disclosure, an exemplary system generates more secure code using the alternate functions. Given code where some basic operations are involved, the system generates more secure code by extracting an operation within program code (202), selecting a formula to perform the equivalent computation as the extracted operation (204), and replacing the extracted operation with the selected formula (206). A user or operator can manually enter equivalent operations. For instance, one operation may be particularly effective at confusing reverse engineering software, so a user enters that operation manually. The formulas to perform the equivalent operations may be represented as a table with rows representing basic operations and columns representing the equivalent formulas. The system replaces basic operations either randomly or deterministically before the code is compiled, using a specific tool such as a parser. The tool accesses the row of the table corresponding to the operation and selects an equivalent function. The system then replaces the basic operation with the new equivalent function. This process is not restricted to the formulas presented, as they are merely exemplary. Other equivalent formulas can be used. One advantage of the discussed formulas is that no intermediate values are needed to make the modification using several popular languages such as C and C++, thus simplifying the tool.

Basic operations can be replaced deterministically based on any single or on a number of criteria. For example, the system can replace basic operations based on a user profile, instructions from a programmer, a desired level of complexity, a target device, etc. Random and deterministic approaches can be blended. For example, to achieve a desired level of complexity and obfuscation, the system can replace basic operations at random until a threshold is reached.

FIG. 5 illustrates the relationship between general and special purpose processors. The special purpose processor utilizes the replaced function rather than the extracted operation. A special purpose processor is typically a processor designed to be extremely efficient in a certain class of applications and/or calculations. The general purpose processor 502 takes data as input and passes that input to a special purpose processor 504. The special purpose processor 504 takes the input from the general processor and performs the special purpose calculation on it. The special purpose processor represents the same functionality as an equivalent function, but stores that functionality in a particular configuration and arrangement of transistors rather than software instructions. The special purpose processor 504 sends its output to the general purpose processor 502 for further processing. This configuration may be desirable when equivalent formulas approach extreme levels of complexity. A purpose-built processor can handle such complex formulas faster and more efficiently than a general purpose CPU. For instance, when the addition operation is recoded in a way that uses less carries, optimizations are possible and some calculations can be performed in parallel. These types of optimizations can be combined with purpose-designed processors for additional performance benefits. Performing calculations in parallel can significantly increase the efficiency of a process since multiple processors work on parts of a problem simultaneously. Although the general purpose processor and the special purpose processor are illustrated separately, one may be incorporated entirely or partially into the other. The special purpose processor may actually be several smaller processors which communicate with each other. Both processors can be connected via a wired connection, such as circuits on a circuit board or Ethernet, or via a wireless connection such as Bluetooth, WiFi, or RFID.

This obfuscation technique can be combined with other known obfuscation and/or encryption techniques in various orders and degrees. A system implementing this method can use a threshold level of complexity to determine the types, amounts, and order of obfuscation. Different orders of combination can result in widely varying results. For example, a special, obfuscating compiler can coordinate and plan different obfuscation techniques automatically as part of an overall obfuscation plan by making certain portions of the code more resistant to reverse engineering attempts.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures, or processor chip design. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the principles described herein can be applied to embedded processors, general purpose computers, portable media players, etc. Such systems can use different methods or the process of replacing the basic operations. Accordingly, the appended claims and their legal equivalents should only define the invention, rather than any specific examples given.

We claim:

1. A method of obfuscating code, the method comprising:
   extracting, via a processor, a plurality of operations within program code, to yield a plurality of extracted operations;

selecting a respective set of formulas to perform an equivalent computation as each of the plurality of extracted operations, wherein each respective set of formulas is selected from a table of alternate operations that are more complex than a corresponding one of the plurality of extracted operations; and before the program code is compiled, obfuscating the program code to make certain portions of the program code more resistant to reverse engineering attempts by replacing at least one of the plurality of extracted operations with the respective set of formulas in the program code until a threshold level of complexity is achieved.

2. The method of claim 1, wherein the respective set of formulas is selected randomly.

3. The method of claim 1, wherein the respective set of formulas is selected deterministically.

4. The method of claim 1, wherein the plurality of extracted operations comprises arithmetic operations.

5. The method of claim 1, wherein the plurality of extracted operations comprises Boolean operations.

6. A system for obfuscating code, the system comprising:
a processor; and
a memory storing instructions for controlling the processor to perform steps comprising:
extracting a plurality of operations within program code to yield a plurality of extracted operations;
selecting a respective set of formulas to perform an equivalent computation as each of the plurality of extracted operations, wherein each respective set of operations is selected from a table of alternate operations that are more complex than a corresponding one of the plurality of extracted operations; and
before the program code is compiled, obfuscating the program code to make certain portions of the program code more resistant to reverse engineering attempts by replacing at least one of the plurality of extracted operations with the respective set of formulas in the program code until a threshold level of complexity is achieved.

7. The system of claim 6, wherein the respective set of formulas is selected randomly.

8. The system of claim 6, wherein the respective set of formulas is selected deterministically.

9. The system of claim 6, wherein the plurality of extracted operations comprises arithmetic operations.

10. The system of claim 6, wherein the plurality of extracted operations comprises Boolean operations.

11. A non-transitory computer-readable storage medium storing instructions which, when executed by a computing device, cause the computing device to perform steps comprising:
extracting a plurality of operations within program code to yield a plurality of extracted operations;
selecting a respective set of formulas to perform an equivalent computation as each of the plurality of extracted operations, wherein each respective set of formulas is selected from a table of alternate operations that are more complex than a corresponding one of the plurality of extracted operations; and
before the program code is compiled, obfuscating the program code to make certain portions of the program code more resistant to reverse engineering attempts by replacing at least one of the plurality of extracted operations with the respective set of formulas in the program code until a threshold level of complexity is achieved.

12. The non-transitory computer-readable storage medium of claim 11, wherein the respective set of formulas is selected randomly.

13. The non-transitory computer-readable storage medium of claim 11, wherein the respective set of formulas is selected deterministically.

14. The non-transitory computer-readable storage medium of claim 11, wherein the plurality of extracted operations comprises arithmetic operations.

15. The non-transitory computer-readable storage medium of claim 11, wherein the plurality of extracted operations comprises Boolean operations.

* * * * *